United States Patent [19]

Wolff

[11] Patent Number: 5,617,894

[45] Date of Patent: Apr. 8, 1997

[54] VALVE BODY

[75] Inventor: Guenter Wolff, Schwieberdingen, Germany

[73] Assignee: Robert Bosch GmbH, Stuttgart, Germany

[21] Appl. No.: 492,883

[22] Filed: Jun. 20, 1995

[30] Foreign Application Priority Data

Aug. 11, 1994 [DE] Germany .......................... 44 28 385.7

[51] Int. Cl.$^6$ ................................. F16K 1/32; F16K 1/14
[52] U.S. Cl. ................................. 137/625.5; 137/625.65; 137/901; 251/129.14; 251/337
[58] Field of Search ............................. 137/539.5, 625.5, 137/625.65, 901; 251/129.14, 337

[56] References Cited

U.S. PATENT DOCUMENTS

| | | | |
|---|---|---|---|
| 4,756,331 | 7/1988 | Stegmaier | 137/625.65 X |
| 4,821,954 | 4/1989 | Bowder | 251/337 X |
| 5,165,655 | 11/1992 | Drexel | |
| 5,211,341 | 5/1993 | Wieczorek | 251/129.16 X |
| 5,447,288 | 9/1995 | Keuerleber et al. | 251/129.16 X |

FOREIGN PATENT DOCUMENTS

| | | |
|---|---|---|
| 0203453 | 8/1990 | European Pat. Off. . |
| 2260183 | 4/1993 | United Kingdom . |

Primary Examiner—Gerald A. Michalsky
Attorney, Agent, or Firm—Edwin E. Greigg; Ronald E. Greigg

[57] ABSTRACT

The invention relates to a valve body which is provided for a solenoid valve. The valve body is held between two perforated disks whose holes each have a collar. The two perforated disks are connected to form a valve body holder. In order to connect the two perforated disks, each have tongues which project through holes of the respective other perforated disk and are bent over in such a way that they hold the two perforated disks against one another. The tongues protrude obliquely from the valve body holder with their free ends. They serve as springs which are supported against an end wall face of a valve chamber and press against a valve seat lying opposite the end wall face. The invention constitutes a cost-effective design of a valve body which is integral with a valve spring.

14 Claims, 2 Drawing Sheets

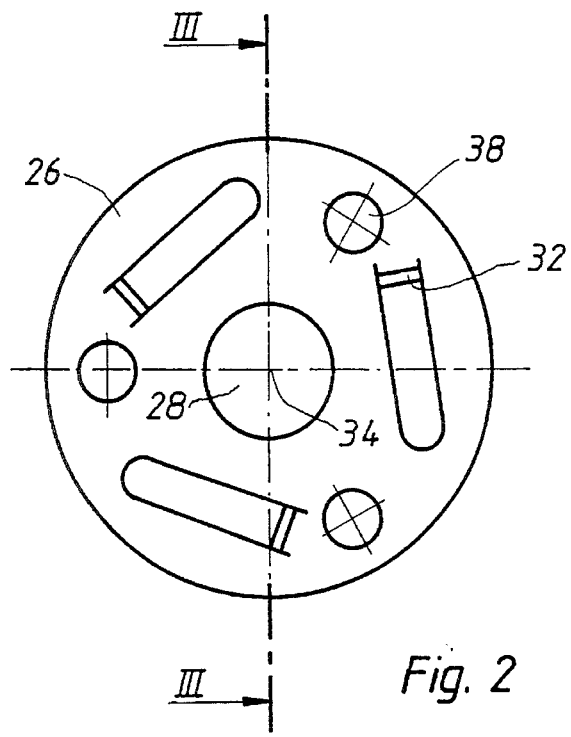
Fig. 2
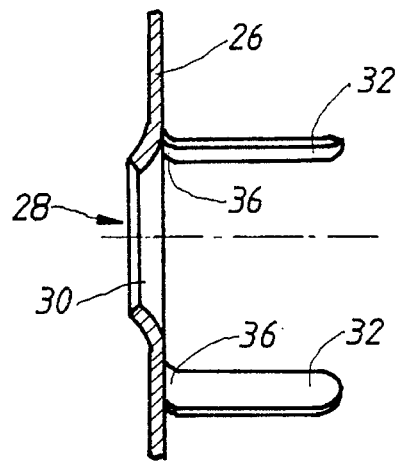
Fig. 3
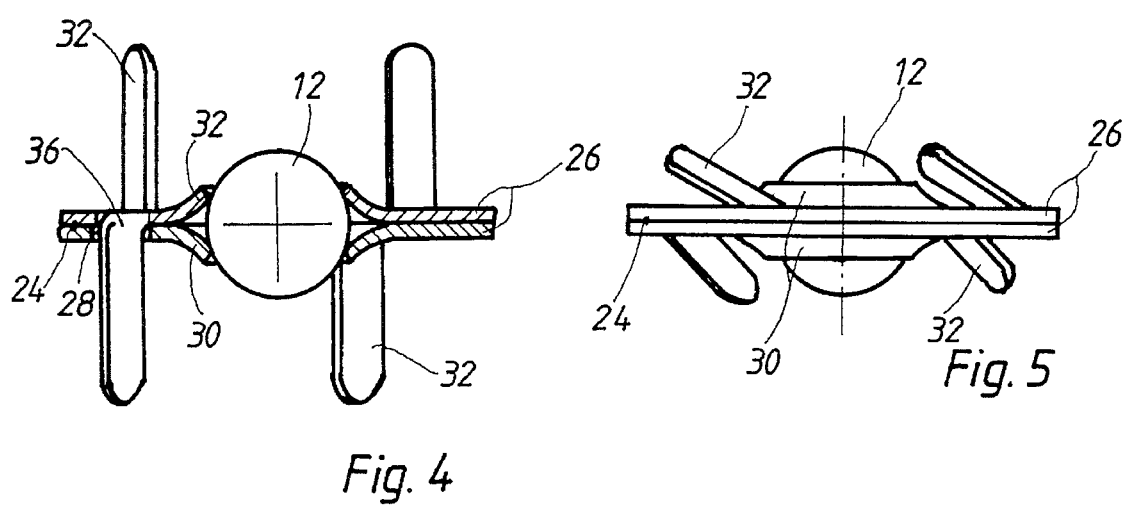
Fig. 4
Fig. 5

VALVE BODY

PRIOR ART

The invention is based on a valve body of the was set forth hereinafter. Such a valve body is used for example in a solenoid valve such as is known from DE 35 18 978 A1. The valve body of the known solenoid valve is a sphere which is pressed against a valve seat by a slotted perforated disk which is supported with its circumferential edge in a valve chamber. In order to open the solenoid valve, the sphere is lifted off from the valve seat counter to the spring force of the perforated disk by a plunger which can be moved by means of an electromagnet, and is pressed into a valve seat lying opposite thereto.

ADVANTAGES OF THE INVENTION

The solenoid valve according to the invention has the advantage that its valve body, the valve body holder and the valve spring as a single-component is small, easy to handle when assembling a valve and the assembly is simple. The individual components of the valve body according to the invention can be produced and connected to one another with little outlay and it is therefore cheap to manufacture. In particular, the two disks are identical, as a result of which the number of different components is reduced. The features relate to advantageous developments and improvements of the subject matter as set forth herein.

BRIEF DESCRIPTION OF THE DRAWINGS

The invention is explained in greater detail below with reference to an exemplary embodiment which is illustrated in the drawing, in which

FIG. 2 shows a perforated disk of the holder of the valve body according to the invention;

FIG. 3 shows a section along the line III—III in FIG. 2;

FIG. 4 shows the valve body according to the invention with perforated disks laid against one another; and FIG. 5 shows the finished valve body according to the invention.

DESCRIPTION OF THE EXEMPLARY EMBODIMENT

Figure 1:
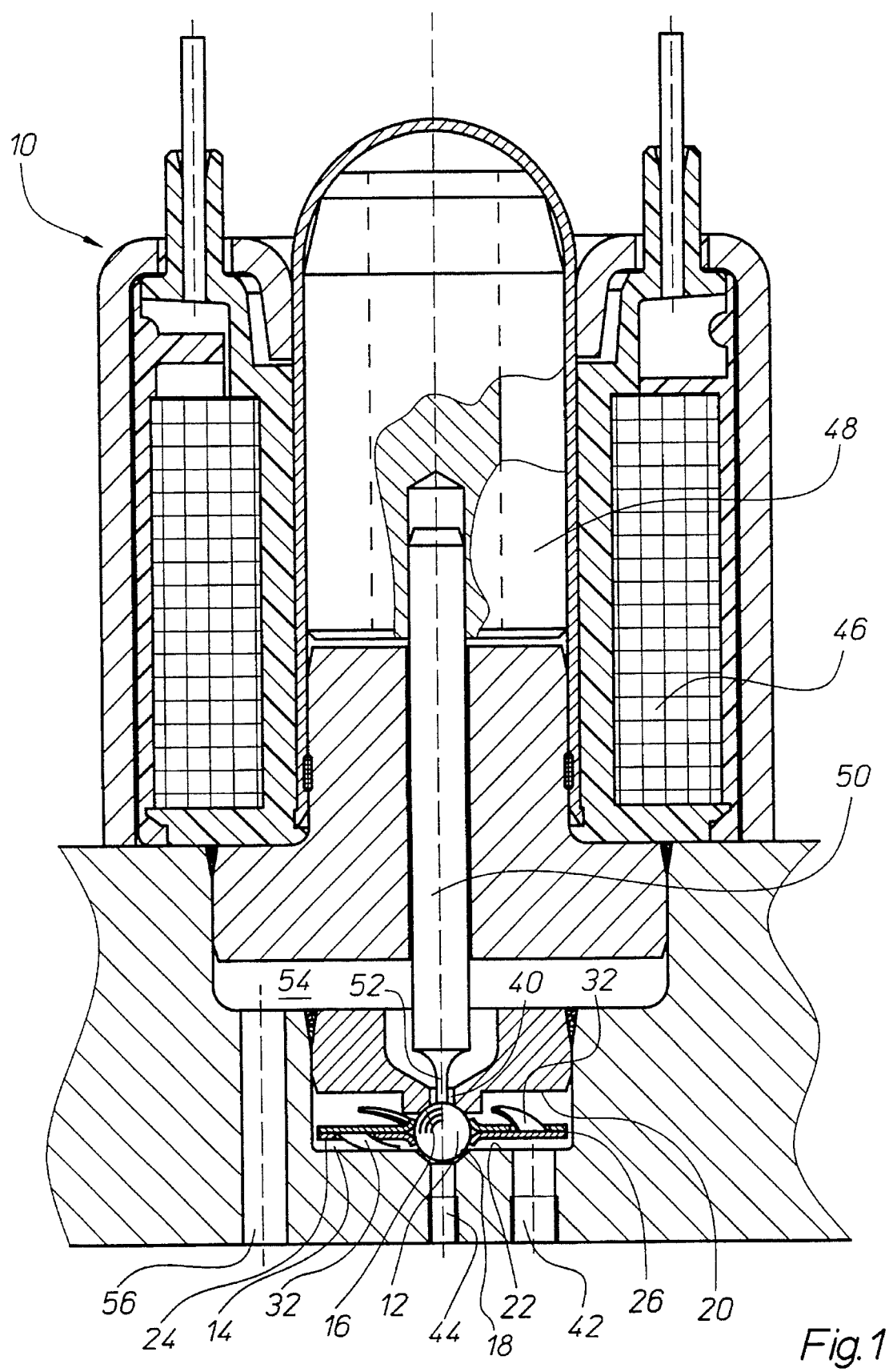
FIG. 1 shows a solenoid valve with a valve body according to the invention.

In FIG. 1, a solenoid valve which is designated in its entirety by 10 is illustrated in section. It has a valve ball 12 as a valve body. The latter is arranged in a flat, cylindrical valve chamber 14 between two valve seats 16, 18 lying opposite one another axially.

The valve seats 16, 18 are conical depressions in the centre of the two end wall faces 20, 22 of the valve chamber 14.

The valve ball 12 is held in a valve ball holder 24. The latter consists of two identical round perforated disks 26 made of spring steel (FIGS. 2 and 3). The edge of the hole 28 of each perforated disk 26 is bent over to form a collar 30 which rises from the plane of the perforated disk 26 in one direction. The diameter of the hole 28 is smaller than the diameter of the valve ball 12.

In order to hold the valve ball 12 in the valve ball holder 24, consisting of two perforated disks 26, the valve ball 12 is inserted into the collar 30 of the one perforated disk 26. The second perforated disk 26 is rested flat onto the first perforated disk 26 (FIG. 4), the collars 30 of the two perforated disks 26 pointing away from one another. The valve ball 12 is held between the two collars 30. By selecting the dimensions, the valve ball 12 is held with tension between the collars 30, i.e. the two perforated disks 26 become deformed elastically in the area of the valve ball 12 when they are pressed against one another.

In order to connect the two perforated disks 26 to one another, each perforated disk 26 has three tongues 32 which are integral with it. The tongues 32 are arranged distributed uniformly over the circumference of the perforated disk 26. During their production, as long as they are still in the plane of the perforated disk 26, the tongues 32 point approximately in the secant direction of the perforated disk 26. They are subsequently bent out of the plane of the perforated disk 26 so that they protrude perpendicularly from the perforated disk 26 in the opposite direction from the collar 30.

Three holes 38 are provided in the perforated disk 26 distributed uniformly over the circumference with the same radial spacing from the center point 34 of the perforated disk 26 as that of the base 36 of the tongues 32. The diameter of the holes 38 is slightly larger than the width of the tongues 32.

In order to connect two perforated disks 26 to one another, after the valve ball 12 has been inserted into the collar 30 of one perforated disk 26, the two perforated disks 26 are rested against one another in such a way that the tongues 32 of one perforated disk 26 projects through the holes 38 of the other perforated disk 26 (FIG. 4). By bending over the tongues 32 of both perforated disks 26, the two perforated disks 26 are connected to one another. The tongues 32 are bent over in such a way that the two perforated disks 26 are pressed on one another. The valve ball 12 is then held under tension between the two collars 30 of the two perforated disks 26.

However, the tongues 32 of at least one of the two perforated disks 26 are bent in such a way that they rest on the other perforated disk 26 only in the region of its base 36. Over the rest of the area of its length, the tongues 32 protrude obliquely from the two perforated disks 26 resting against one another. In this way, the tongues 32 form springs of the valve ball holder 24.

In FIG. 5, the tongues 32 of both perforated disks 26 protrude obliquely from the perforated disks 36 as springs. In a modification of this, the tongues 32 of one of the two perforated disks 26 can be bent over to rest flat on the other perforated disk 26. A valve ball holder constructed in this way (not shown in the drawing) has three tongues 32 which are constructed as springs and protrude obliquely from the two perforated disks 26 in one direction.

In FIG. 1, three of the tongues 32, constructed as springs, of the valve ball holder 24 are supported against an end wall face 22 of the valve chamber 14 and press the valve ball 12 in a sealing fashion against the valve seat 16 lying opposite this end wall face 22. A port 40 which opens at this valve seat 16 is thus closed when the solenoid valve 10 is deenergized.

The valve seat 16 against which the valve ball 12 is pressed when the solenoid valve 10 is deenergized is raised with respect to the end wall face 20 in which it is located so that the tongues 32, pointing towards this end wall face 20, of the valve ball holder 24 are at a distance from this end wall face 20. These last mentioned tongues 32 therefore project freely into the valve chamber 14 and do not exert any spring function.

When the solenoid valve 10 is deenergized, the valve ball 12 is spaced from the second valve seat 18 of the valve chamber 14 so that hydraulic fluid can flow out of a feed line 42, which opens into the valve chamber 14, through the valve chamber 14 into a first outlet line 44 which opens into the valve chamber 14 with the valve seat 18 open when the solenoid valve 10 is deenergized.

In order to activate the solenoid valve 10, an electromagnet arrangement is provided with a magnet coil 46 which is fixed with respect to the valve chamber 14 and an armature 48 which is arranged therein and can be displaced in its axial direction and into which a plunger 50 is permanently inserted. A tip 52 of the plunger 50 projects into the port 40, which is closed off when the solenoid valve 10 is deenergized, and rests on the valve ball 12.

If a current flows through the magnet coil 46, the armature 48 moves with the plunger 50 in the direction of the valve chamber 14. By means of its tip 52, the plunger 50 lifts the valve ball 12 off the valve seat 16 and presses it, counter to the spring force of the tongues 32 which are supported on the end wall face 22 lying opposite, in a sealing fashion against the valve seat 18 which is open when the solenoid valve 10 is deenergized. Hydraulic fluid fed through the feed line 42 now flows through the valve chamber 14 around the outside of the valve ball holder 24 and through the holes 38 of the two perforated disks 26 (cf. FIG. 2), forming the valve ball holder 24, into the port 40 which is now open. The hydraulic fluid moves through the port 40, past the plunger 50 and into a secondary chamber 54 and from there out of the solenoid valve 10 through a second outlet line 56 which opens into the secondary chamber 54.

The foregoing relates to preferred exemplary embodiments of the invention, it being understood that other variants and embodiments thereof are possible within the spirit and scope of the invention, the latter being defined by the appended claims.

I claim:

1. A valve comprising a valve ball (12) which is held between two disks (26) which are identical in size, shape and material and are connected to each other to form a valve ball holder (24), each of said two disks is constructed as a valve spring.

2. The valve according to claim 1, wherein each of the two disks (26) is a sheet-metal disk which has a break-out (38) and includes tongues (32) for connection to each other.

3. The valve according to claim 2, wherein each of the two disks (26) is a sheet-metal disk which has integral spring tongues (32).

4. The valve according to claim 2, wherein each of the two disks (26) has a hole (28) with a collar (30).

5. The valve according to claim 2, which includes a valve chamber (14) and said valve ball is freely movable within said valve chamber with said two disks.

6. The valve according to claim 1, wherein each of the two disks (26) is a sheet-metal disk which has integral spring tongues (32).

7. The valve according to claim 6, wherein each of the two disks (26) has a hole (28) with a collar (30).

8. The valve according to claim 1, wherein each of the two disks (26) has a hole (28) with a collar (30).

9. A valve according to claim 1, which includes a solenoid for operation of said valve ball (12).

10. The valve according to claim 9, wherein the valve ball in combination with said two disks is arranged with play between two valve seats (16, 18) lying opposite one another and said valve ball is pressed against one of the two valve seats (16, 18).

11. The valve according to claim 1, wherein each of said two disks (26) is formed as a sheet-metal disk which has a break out (38) for connection to the other disk (26).

12. The valve according to claim 1, wherein each of said two disks (26) is formed as a sheet-metal disk which has tongues (32) for connection to the other disk (26).

13. The valve according to claim 1, which includes a valve chamber (14) and said valve ball is freely movable within said valve chamber with said two disks.

14. The valve according to claim 1 wherein said two disks are connected face-to-face and said valve includes two opposed valve seats with said valve ball between said two opposed valve seats.

\* \* \* \* \*